United States Patent [19]

Cärlström

[11] 4,139,025
[45] Feb. 13, 1979

[54] GLASS FIBER REINFORCED PIPE
[75] Inventor: Börge I. Carlström, Nyhamnslaege, Sweden
[73] Assignee: Hobas Engineering AG, Switzerland
[21] Appl. No.: 811,146
[22] Filed: Jun. 28, 1977
[30] Foreign Application Priority Data
Jul. 2, 1976 [CH] Switzerland ............... 8483/76
[51] Int. Cl.² ................................. F16L 9/12
[52] U.S. Cl. ......................... 138/153; 138/174
[58] Field of Search ......... 138/172, 153, 177, DIG. 2, 138/125, 173, 174

[56] References Cited
U.S. PATENT DOCUMENTS

| Re. 29,112 | 1/1977  | Carter     | 138/172 |
|------------|---------|------------|---------|
| 3,483,896  | 12/1969 | Grosh      | 138/153 |
| 3,532,132  | 10/1970 | Rubenstein | 138/153 |

Primary Examiner—Richard E. Aegerter
Assistant Examiner—L. Footland
Attorney, Agent, or Firm—McGlew and Tuttle

[57] ABSTRACT

A glass fiber reinforced multilayer pipe of plastic, comprises a wall having a plurality of plastic layers interconnected together and having a central wall axis with a median area on each side of the axis directly adjacent the axis and with an outer area radially outwardly from said median area, and an inner area radially inwardly of said median area. The plastic layers of the pipe wall include a plurality of glass fiber reinforced plastic layers and a plurality of plastic bonded granular filler material layers. The glass fiber reinforced plastic layers are provided both in the inner area and the outer area and the percentage of reinforcing glass fiber in the outer area is less than the percentage in the inner area. The ratio of the outer area glass fiber percentage to the inner glass fiber percentage is preferably 3 : 5. The construction advantageously includes a plastic bonded granular filler material in the layer or layers in the median area, either with or without the addition of a fiber reinforced plastic layer in the median area. The outer areas and the inner areas may be provided with one or more plastic bonded filler material layers and one or more glass fiber reinforced plastic layers. The glass fiber reinforced plastic layers advantageously include glass fibers which are oriented in a circumferential direction in some of the layers and glass fibers which are oriented in a random manner in some of the other layers.

11 Claims, 5 Drawing Figures

GLASS FIBER REINFORCED PIPE

FIELD AND BACKGROUND OF THE INVENTION

The present invention relates in general to pipe constructions and, in particular, to a new and useful glass fiber reinforced tube or pipe of plastic comprising, in addition to plastic layers containing glass fiber pieces, layers of plastic-bonded granular filler material.

DESCRIPTION OF THE PRIOR ART

It is well known that such tubes, depending on their intended uses, for example, pressureless sewer pipes laid underground or so-called pressure tubes for the range of 10 atm or more of internal pressure, require a definite amount of glass as reinforcing material, and that this glass is advantageously distributed among a plurality of layers of plastic which are radially separated from each other by layers of a granular filler material. At the same time, in spite of their radial elasticity, the tubes must possess a satisfactory circumferential rigidity and satisfactory axial bending strength. Care has therefore been taken to have the fiber pieces oriented, particularly in some of the layers, in the circumferential direction, and in other layers, in the axial direction, as far as possible. However, experience has shown in many cases that the required strength values can only be obtained by using undesirably large amounts of glass.

SUMMARY OF THE INVENTION

The present invention is directed to a tube or pipe of plastic, in which the desired strength properties corresponding to the intended application is obtained with a minimum of glass, and for any diameter used in practice, i.e., for example, for diameters varying between 30 cm and 300 cm. In accordance with the invention, this unexpected result is ensured by providing that the glass proportion in the reinforced layers of plastic extending in a zone located radially outwardly of the median zone is smaller than the glass proportion in the reinforced layers extending in a zone located radially inwardly of the median zone.

Further, it has been found to be particularly advantageous to provide the glass proportions in the outer zone and the inner zone in a ratio of about 3:5. In tubes where no high resistance to interior pressure is needed, the entire necessary amount of glass may be divided between the outer and inner zones in the ratio mentioned. The median zone containing the neutral axis may be formed by a non-reinforced, relatively thick, filler layer. On the contrary, if a pressure tube is concerned, it is advantageous to provide about 50% of the total amount of glass in the layers of the median zone, while the other 50% may be divided, in the ration of 3:5, between the layers of the outer and the inner zones.

Accordingly, it is an object of the invention to provide a glass fiber reinforced multilayer pipe of plastic comprising a wall having a plurality of plastic layers interconnected together and having a central wall axis with a median area on each side of the central axis and including an outer area extending radially outwardly of the median area and an inner area extending radially inwardly of the median area and wherein the plastic layers include a plurality of glass fiber reinforced layers as well as plastic bonded granular filler material layers, the glass fiber layers being located both in the inner area and outer area and the percentage of reinforcing glass fiber in the outer area being less than the percentage of glass fiber reinforcing in the inner area.

A further object of the invention is to provide a glass fiber reinforced multilayer tube or pipe of plastic which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 1:
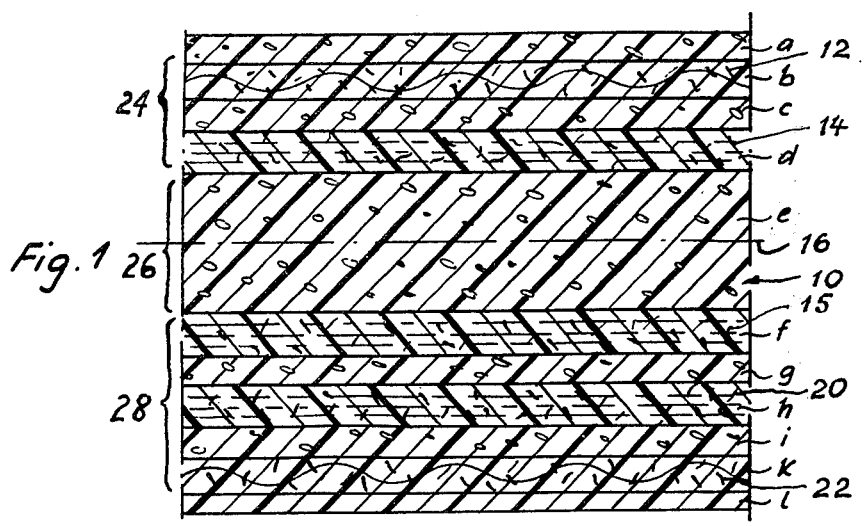
FIG. 1 is an axial sectional view of a wall of a pressureless tube or pipe comprising five reinforced layers, constructed in accordance with the invention.

Referring to the drawings in particular, the invention embodied therein in FIG. 1 comprises a tube or pipe, generally designated 10, which has a wall made up of multilayers of plastic material, with the wall thickness having a central line 16. Plastic pipe 10 shown in FIG. 1 is advantageously used as a pipe which is substantially free from internal pressure and is made in diameters varying from 50 cm and 200 cm. The pipe 10 comprises a wall made up of five layers of plastic, each of which are reinforced with glass fiber pieces and they are separated from each other by filler layers of a plastic-bonded inorganic granular material, such as sand, but which are homogeneously interconnected by the plastic which is present in all of the layers. Considered in the radial direction, from the outside to the inside, the following layers are present:

Layer a is an outer, so-called gelcoat protective layer which advantageously has a thickness of only about 1 mm;

b is a first reinforced layer containing glass fiber pieces 12 which are about 50 mm long and are oriented circumferentially;

c is a relatively thin layer of granular filler material;

d is a second reinforced layer in which the fiber pieces 14 are about 50 mm long and are oriented randomly, in all directions;

e is a relatively thick layer of granular filler material located in the range of the median zone of the wall where the wall neutral axis 16 is included;

f is a third reinforced layer which is analogous to layer d and contains 50 mm long, randomly oriented, glass fiber pieces 18;

g is a relatively thin layer of granular filler material;

h is a fourth reinforced layer, which is analogous to layers d and f and contains glass fiber pieces which are 50 mm long and randomly oriented;

i is another relatively thin layer of granular filler material;

k is a fifth reinforced layer which is analogous to the first reinforced layer b and contains about 50 mm long, circumferentially oriented, glass fiber pieces 22; and l is an inner gelcoat or cover layer having a thickness which is advantageously about 1 mm.

Beginning from the desired diameter of the tube, the amount of glass necessary for the required strength values is determined and divided between layers b and d of the outer zone 24 which is outward of a median zone 26, and layers f, h and k of the inner zone 28 which is inward of the median zone, is in the proportion of about 3 : 5.

The first and second reinforced layers b and d are of equal thickness. The same applies to the third and fourth reinforced layers f and h, while the fifth reinforced layer k is double the thickness of the fourth layer h. The thickness of layers b and d is calculated so that the radially outer wall zone 24 provides approximately ⅜ of the axial strength of the tube. Analogously, the thickness of layers f and h is calculated so that the radially inner wall zone 28 provides approximately ⅝ of the axial strength. The thickness of the granular filler layer c and of that portion of layer e which is located outside of the neutral axis are calculated so that this outward part of the wall provides approximately one half of the rigidity of the tube, while the other half is distributed among the inside portion of layer e and layers g and i. In this arrangement, the glass proportion radially outside the neutral axis 16 is approximately between 7 and 9% by weight, depending on the tube diameter, while the glass proportion in the radially inner zone (including the gelcoat) is between 10% and 14% by weight. It is to be understood that the respective higher values apply to smaller tube diameters and the higher values to larger tube diameters. Due to the distribution of the glass content and of the filler layers provided, the optimum number of layers, layer thickness, and fiber orientation can be determined for any application and size. To be sure, such tubes may be manufactured both by centrifuging in a shell mold and by application on a core, or by a combination of such processes.

Figure 2:
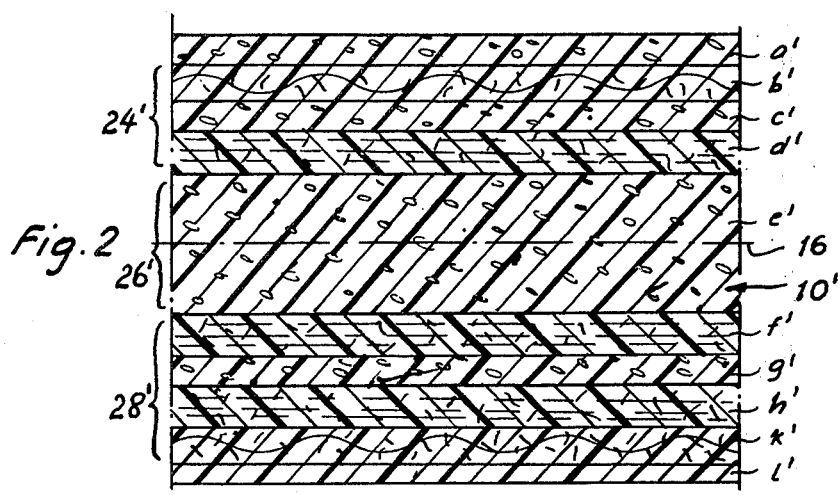
FIG. 2 is a view similar to FIG. 1, showing a first variant comprising five reinforced layers.

In the variation of the pipe 10', shown in FIG. 2, the granular filler layer i located between the reinforced layers h' and k' of the radially inner zone 28' is omitted. Otherwise, the structure of the reinforced layers corresponds to that of the embodiment of FIG. 1. In this case, the initial rigidity of the tubes is slightly smaller than that of the first embodiment.

Figure 3:
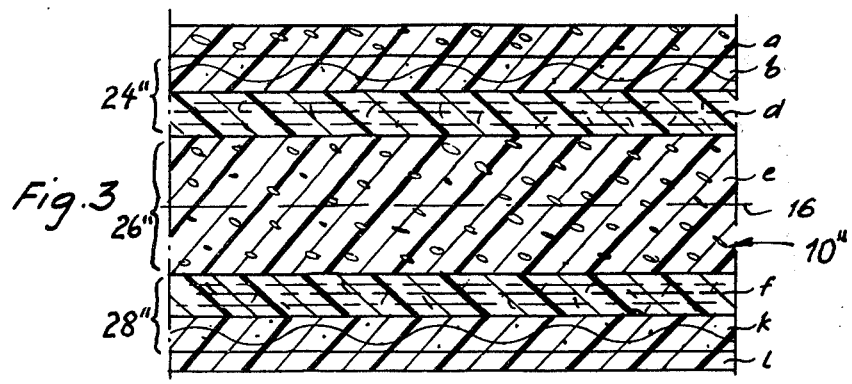
FIG. 3 is a view similar to FIG. 1, showing a second variant comprising four reinforced layers.

FIG. 3 shows an embodiment of pipe 10" which is particularly suitable for larger diameters, for example, of 120 cm and more. The tube comprises four glass fiber reinforced layers b, d, f and k wherein, the radially outermost and innermost layers b and k contain circumferentially oriented glass fiber pieces, while layers d and f immediately adjacent thereto, and thus not separated therefrom by granular filler layers, contain glass fiber pieces which are oriented randomly in all directions. In all cases, however, the principle is observed that the reinforced layers b and d of the radially outer zone 24" contain a smaller amount of glass than layers f and k of the radially inner zone 28". At the same time, the thickness of layer b is one half of that of layer d, while the two layers f and k advantageously have the same thickness. In this construction, it has been found to be advantageous to provide a glass content of at least between 12% and 10.5% in the outer zone 28"', depending on the tube diameter, and of at least between 18% and 15.5% in the inner zone.

Figure 4:
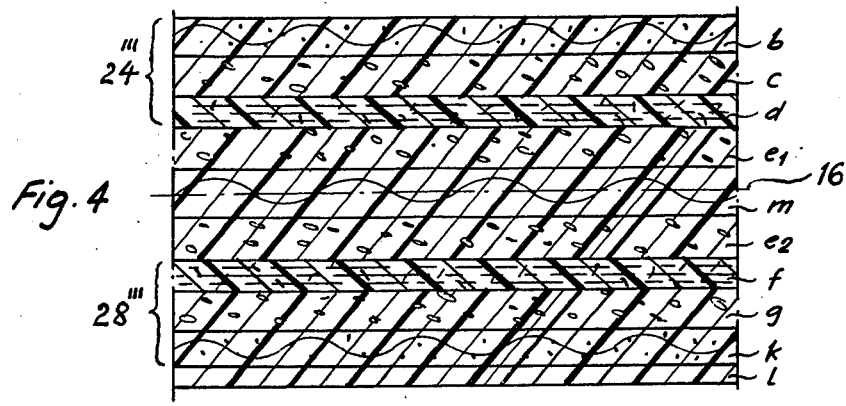
FIG. 4 is an axial sectional view of a wall of a pressure tube comprising five reinforced layers, constructed in accordance with the invention.

The resistance to internal pressure, for example, of 10 atm and more, of pressure tubes, requires a reinforcement of the median zone, which reinforcement must increase the circumferential tensile strength. Experience has shown that a multilayer tube of the present kind, i.e., with a glass proportion which is smaller outside than inside, can be designed as a pressure tube also, if a reinforced layer is provided in the median zone which contains about one half of the total glass amount and in which the glass fiber pieces are relatively long, for example, between 60 mm and 300 mm, and oriented in the circumferential direction. At the same time, it is possible to provide in the outward zone 24'" a single or two reinforced layers, while in the radially inner zone 28"', containing more glass, two or more reinforced layers are advantageous. An example of such a tube is shown in FIG. 4.

The radially outermost and innermost layers b and k contain relaitvely short, circumferentially oriented glass fiber pieces, for example, 50 mm long, while the reinforced layers d and f located closer to the wall center and separated from layers b and k by relatively thin, (thicknesses of 1 to 2 mm), filler layers c and g of granular filler material also contain short, but randomly oriented glass fiber pieces. The reinforced layer m located in the median zone between two granular filler layers $e_1$ and $e_2$ contains relatively short, for example, 200 mm, circumferentially oriented glass fiber pieces. The glass proportions of the outside, median and inside zones are advantageously 3/16, 8/16 and 5/16, respectively, of the total glass amount. The thickness of granular filler layer g should be approximately between 1 mm and 2 mm, while the preferable thickness of the outer layer c of granular filler material is between 2 mm and 4 mm.

Figure 5:
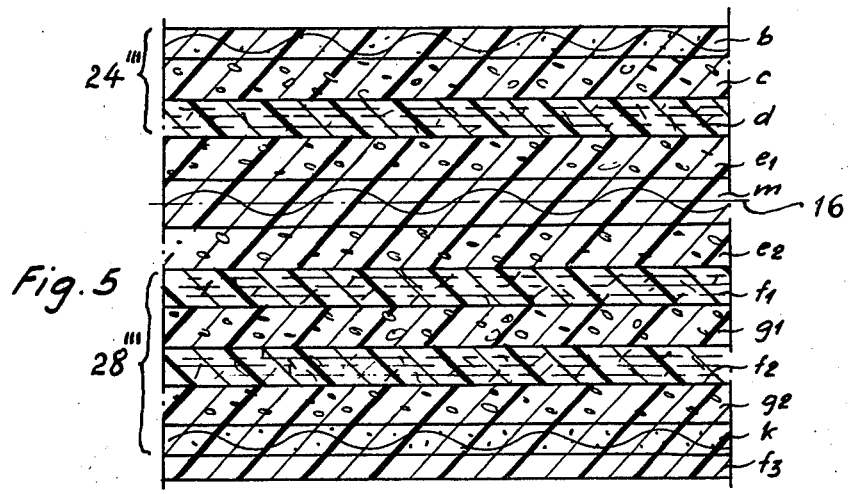
FIG. 5 is a view similar to FIG. 4, showing a variant comprising seven reinforced layers.

A particularly advantageous embodiment of a pressure tube or pipe is shown in FIG. 5. The tube comprises seven reinforced layers b, d, m, $f_1$, $f_2$, k and $f_3$, the structure of which, as to the length and orientation of the glass fiber pieces, corresponds to that of the analogously designed layers of the previous example. Here again, the granular filler layer c should contain more of the granular filler material than the radially inwardly located layers $g_1$ and $g_2$, and also the ratio of the glass proportions between layers b and d, the layer m, and layers $f_1$, $f_2$, k and $f_3$ is advantageously again approximately 3/16 : 8/16 : 5/16. The necessary total glass content is determined for a tube having a definite diameter in accordance with the desired resistance to internal pressure, and then the proportions and thicknesses of the different reinforced layers can be calculated.

Thus, the inventive pipes or tubes can be adjusted exactly to the respective application without having to use an excessive amount of expensive glass.

While specific embodiments of the invention have been shown and described in detail to illustrate the application of the principles of the invention, it will be understood that the invention may be embodied otherwise without departing from such principles.

What is claimed is:

1. A glass fiber reinforced multilayer pipe of plastic, comprising a wall having a plurality of plastic layers interconnected together and having a central wall axis with a median area defined on each side of said axis, an outer area extending radially outwardly from said median area and an inner area extending radially inwardly of said median area, said plastic layers of said pipe including a plurality of glass fiber reinforced plastic layers and a plurality of plastic bonded granular filler material layers, said glass fiber reinforced layers being provided in both said inner area and said outer area and the percentage of said reinforcing glass fibers in said outer area being less than the percentage of glass fiber reinforcing in said inner area, said glass fiber reinforced layers comprising at least one layer having approximately 50 mm long circumferentially oriented fiber reinforcing pieces and at least one layer having approximately 50 mm long randomly oriented fiber pieces.

2. A glass fiber reinforced multilayer pipe of plastic, according to claim 1, wherein the proportion of glass fibers in the outer area in respect to the inner area is approximately 3 : 5.

3. A glass fiber reinforced multilayer pipe of plastic, according to claim 2, wherein there are at least one plastic bonded granular filler material layers between the glass fiber reinforced layers of both the outer and inner areas.

4. A glass fiber reinforced multilayer pipe of plastic, according to claim 1, wherein said outer and inner areas comprise at least two glass fiber reinforced layers each.

5. A glass fiber reinforced multilayer pipe of plastic, according to claim 1, wherein said pipe comprises a pipe for use under internal pressure, the glass proportion in the median zone comprising approximately 50% of the total amount of glass in said pipe wall.

6. A glass fiber reinforced multilayer pipe of plastic, according to claim 1, wherein said outer area includes plastic bonded granular filler material layers arranged in between adjacent glass fiber reinforced layers, said median area having filler material layers which are less thick than the granular filler materials in the outer and inner areas between said plastic reinforced layers.

7. A glass fiber reinforced multilayer pipe of plastic, according to claim 1, wherein said pipe comprises seven glass fiber reinforced layers which, except for the two innermost reinforced layers immediately adjacent each other, are separated from each other by plastic bonded filler material layers, said reinforced fiber layers of the first, third and sixth reinforced layers proceeding in a radially inward direction are oriented circumferentially while the fiber pieces of the other reinforced layers are oriented randomly, the fiber pieces of the third reinforced layer having a length which is a multiple of the length of the fiber pieces contained in the other reinforced layers.

8. A glass fiber reinforced multilayer pipe of plastic, according to claim 1, wherein said pipe comprises a pipe without internal pressure, said median area comprising a relatively thick layer of plastic bonded granular filler material.

9. A glass fiber reinforced multilayer pipe of plastic, according to claim 1, wherein the percentage of glass fiber reinforcement in the outer area is at least between 7% and 12% and the proportion by weight of glass fiber in the inner area is at least 10% to 16%, the percentage decreasing with increasing diameter of said pipe.

10. A glass fiber reinforced multilayer pipe of plastic, comprising a wall having a plurality of layers of resilient plastic material interconnected together and having a central wall axis with a median area defined on each side of said axis, an outer area extending radially outwardly from and plastic bonded to said median area and an inner area extending radially inwardly of and plastic bonded to said median area, said outer and inner plastic layers of said pipe including a plurality of glass fiber reinforced plastic layers and a plurality of plastic bonded granular filler material layers, said glass fiber reinforced layers being provided in both said inner area and said outer area and having reinforcing fibers comprising a multiplicity of fiber pieces with the percentage of said reinforcing glass fibers in said outer area being less than the percentage of glass fiber reinforcing in said inner area and with at least one of said glass fiber reinforced layers including fiber pieces which are oriented differently from the glass fiber pieces of at least one other glass fiber reinforced layer.

11. A glass fiber reinforced multilayer pipe of plastic, comprising a wall having a plurality of plastic layers interconnected together and having a central wall axis with a median area defined on each side of said axis, an outer area extending radially outwardly from said median area and an inner area extending radially inwardly of said median area, said plastic layers of said pipe including a plurality of glass fiber reinforced plastic layers and a plurality of plastic bonded granular filler material layers, said glass fiber reinforced layers being provided in both said inner area and said outer area and the percentage of said reinforcing glass fibers in said outer area being less than the percentage of glass fiber reinforcing in said inner area, said outer area including two glass fiber reinforced layers, said inner area including three glass fiber reinforced layers having a plastic granular filler material layer therebetween, the outermost reinforced layer of said outer area and the innermost reinforced layer of said inner area comprising approximately 50 mm long circumferentially oriented fiber reinforcing pieces, and the other of said glass fiber reinforced layers comprising approximately 50 mm long randomly oriented fiber pieces.

* * * * *